United States Patent
Kim et al.

(10) Patent No.: US 8,975,351 B2
(45) Date of Patent: Mar. 10, 2015

(54) LATEX RESIN COMPOSITION FOR RUBBER GLOVES WITHOUT SULFUR AND VULCANIZATION ACCELEATOR AND METHOD OF MANUFACTURING DIP-FORMED ARTICLE USING THE COMPOSITION

(75) Inventors: Byoung Yun Kim, Seoul (KR); Jung Su Han, Daejeon (KR); Ho Yeul Choi, Daejeon (KR); Seung Hun Yang, Daejeon (KR); Jung Eun Kim, Daejeon (KR); Chang Sun Han, Daejeon (KR)

(73) Assignee: LG Chem, Ltd., Seoul (KR)

( * ) Notice: Subject to any disclaimer, the term of this patent is extended or adjusted under 35 U.S.C. 154(b) by 834 days.

(21) Appl. No.: 13/121,151

(22) PCT Filed: Aug. 10, 2009

(86) PCT No.: PCT/KR2009/004444
§ 371 (c)(1),
(2), (4) Date: Jun. 6, 2011

(87) PCT Pub. No.: WO2010/035955
PCT Pub. Date: Apr. 1, 2010

(65) Prior Publication Data
US 2011/0229646 A1     Sep. 22, 2011

(30) Foreign Application Priority Data

Sep. 26, 2008 (KR) .................. 10-2008-0094389

(51) Int. Cl.
| | | |
|---|---|---|
| C08F 220/46 | (2006.01) | |
| C08F 222/30 | (2006.01) | |
| C08F 212/34 | (2006.01) | |
| C08F 136/04 | (2006.01) | |
| C08F 236/12 | (2006.01) | |
| C08J 5/02 | (2006.01) | |
| C08L 13/02 | (2006.01) | |
| C08F 36/06 | (2006.01) | |
| C08F 36/08 | (2006.01) | |
| C08F 36/04 | (2006.01) | |
| C08F 222/02 | (2006.01) | |

(52) U.S. Cl.
CPC .............. C08F 236/12 (2013.01); *C08F 36/06* (2013.01); *C08F 222/30* (2013.01); *C08F 36/08* (2013.01); *C08F 36/04* (2013.01); *C08F 222/02* (2013.01); *C08F 36/045* (2013.01); C08J 5/02 (2013.01); *C08J 2321/02* (2013.01); C08L 13/02 (2013.01)

USPC ... 526/342; 526/297; 526/317.1; 526/318.25; 526/338; 526/340

(58) Field of Classification Search
CPC ...... C08F 222/30; C08F 222/02; C08F 36/04; C08F 36/06; C08F 36/08; C08F 36/045
USPC .......... 526/342, 397, 318.25, 338, 340, 317.1
See application file for complete search history.

(56) References Cited

U.S. PATENT DOCUMENTS

| | | | | |
|---|---|---|---|---|
| 4,102,844 A | * | 7/1978 | Schwinum et al. ............ | 524/745 |
| 4,332,860 A | * | 6/1982 | Heins et al. .................... | 428/473 |
| 5,026,807 A | | 6/1991 | Ohira et al. | |
| 5,783,625 A | * | 7/1998 | Mori et al. ..................... | 524/509 |
| 6,369,154 B1 | * | 4/2002 | Suddaby ........................ | 524/560 |
| 6,624,274 B1 | | 9/2003 | Suddaby | |
| 7,183,347 B2 | * | 2/2007 | Ota et al. ....................... | 524/430 |
| 7,345,111 B2 | * | 3/2008 | Ozawa et al. ................. | 524/822 |
| 8,044,138 B2 | * | 10/2011 | Han et al. ...................... | 524/571 |
| 2002/0013963 A1 | | 2/2002 | Nakamura et al. | |
| 2004/0010067 A1 | | 1/2004 | Ota et al. | |
| 2007/0100063 A1 | | 5/2007 | Ozawa et al. | |

FOREIGN PATENT DOCUMENTS

| | | |
|---|---|---|
| CN | 1891739 A | 1/2007 |
| JP | 06240599 A * | 8/1994 |
| JP | 2006-32-1955 | 11/2006 |

* cited by examiner

*Primary Examiner* — Ling Choi
*Assistant Examiner* — David L Miller
(74) *Attorney, Agent, or Firm* — McKenna Long & Aldridge LLP

(57) ABSTRACT

The present invention provides a latex resin composition for rubber gloves without sulfur and a vulcanization accelerator and a method of manufacturing dip-formed article using the composition. The composition comprises a conjugated diene monomer; an ethylenically unsaturated nitrile monomer; an ethylenically unsaturated acid monomer; an ethylenically unsaturated monomer copolymerizable with the ethylenically unsaturated nitrile monomer and the ethylenically unsaturated acid monomer; and a reactive compound including two or more reactive groups. According to the manufacturing method, productivity is improved by omitting a long maturation process included in a traditional glove manufacturing process; not only an adverse effect caused by traditional sulfur and vulcanization accelerator is reduced but also rubber gloves with excellent physical properties can be provided.

8 Claims, No Drawings

LATEX RESIN COMPOSITION FOR RUBBER GLOVES WITHOUT SULFUR AND VULCANIZATION ACCELEATOR AND METHOD OF MANUFACTURING DIP-FORMED ARTICLE USING THE COMPOSITION

BACKGROUND OF THE INVENTION

1. Field of the Invention

This application is a national stage application of PCT/KR2009/004444 filed on Aug. 10, 2009, which claims the priority to Korean Patent Application No. 10-2008-0094389 filed on Sep. 26, 2008, all of which are herein incorporated by reference in their entirety.

The present invention relates to latex resin composition for rubber gloves. More specifically, the present invention has been made in an effort to provide latex resin composition containing neither sulfur nor a vulcanization accelerator with which rubber gloves can be manufactured by using a reactive compound including two or more reactive groups, thereby improving productivity by omitting a long maturation process included in a traditional glove manufacturing process and resolving a problem due to an adverse effect caused by traditional sulfur and vulcanization accelerator.

2. Description of the Related Art

Rubber gloves have been used in various areas such as housekeeping, food industry, electronics industry, medical industry, and so on. So far, rubber gloves manufactured by dip forming have been widely accepted; however, protein contained in natural rubber caused an allergic reaction such as pain or skin eruption against some users. Due to this reason, people have commonly used rubber gloves manufactured by dip forming of synthetic rubber latex which does not bring about the allergic reaction—for example, latex composition made by carboxylic acid modified-nitrile based copolymer latex such as acrylic acid acrylonitrile-butadiene copolymer latex combined with sulfur and a vulcanization accelerator.

However, since the above process of manufacturing gloves requires a long maturation process usually more than 24 hours after sulfur and a vulcanization accelerator are added to the latex, productivity can be dropped. Also, rubber gloves incorporating sulfur and a vulcanization accelerator as essential components, if people continue their work for many hours while wearing the rubber gloves, may cause inconvenience by giving out a smell caused by sulfur; suffer discoloration, decreasing the value of the rubber gloves as a product; and bring about allergic reactions against some users, causing pinching pains.

Japanese patent application No. 2006-321955 describes a method for obtaining a dip-formed article using neither sulfur nor a vulcanization accelerator, where the method removes a long maturation process by using a dip forming latex composition incorporating conjugated diene rubber latex and organic peroxide and manufactures gloves free from discoloration even when the gloves are used for many hours. However, the organic peroxide solution is very dangerous for a human body and has a high risk of fire and explosion when heat or impact is applied thereto.

U.S. Pat. No. 7,345,111 B2 describes gloves which not only removes a long maturation process by applying a crosslinkable monomer to acrylic emulsion latex but also prevents allergic reactions due to sulfur and a vulcanization accelerator. The disadvantage thereof, however, is that acrylic gloves are too sensitive to heat.

SUMMARY OF THE INVENTION

Therefore, the present invention has been made to provide latex resin composition for rubber gloves which improves productivity by removing a long maturation process in a traditional glove manufacturing process by using a crosslinkable reactive compound during a polymerization process of carboxylic acid modified-nitrile based copolymer latex; prevents allergic reactions due to sulfur and a vulcanization accelerator; and provides a molding product having oil resistance, high mechanical strength, and a feeling of soft touch.

Another object of the present invention is to provide a method for manufacturing dip-formed article by using the latex resin composition above.

Technical Solution

To solve the above problem, in a latex resin composition for rubber gloves including a conjugated diene monomer; an ethylenically unsaturated nitrile monomer; an ethylenically unsaturated acid monomer; and an ethylenically unsaturated monomer copolymerizable with the ethylenically unsaturated nitrile monomer and the ethylenically unsaturated acid monomer, the present invention provides a latex resin composition further comprising a reactive compound which includes two or more reactive groups.

The molecular weight of the reactive compound is 250 or more.

The reactive group is selected from among vinyl group, epoxy group, and glycidyl group.

The content of the composition includes 40~90 weight % of a conjugated diene monomer; 9~50 weight % of an ethylenically unsaturated nitrile monomer; 0.1~10 weight % of an ethylenically unsaturated acid monomer; 0.1~20 weight % of an ethylenically unsaturated monomer copolymerizable with the monomer; and 0.1~5 weight % of an reactive compound including two or more reactive groups.

The conjugated diene monomer is 1,3-butadiene, 2,3-dimethyl-1,3-butadiene, 2-ethyl-1,3-butadiene, 1,3-pentadiene, isoprene, or a combination of the above.

The ethylenically unsaturated nitrile monomer is acrylonitrile, methacrylonitrile, fumaronitrile, α-chloronitrile, α-cyanoethylacrylonitrile, or a combination of the above.

The ethylenically unsaturated acid monomer is ethylenically unsaturated carboxylic acid monomer, polycarboxylic acid anhydride, ethylenically unsaturated sulfonic acid monomer, ethylenically unsaturated polycarboxylic acid partial ester monomer, or a combination of the above.

An ethylenically unsaturated monomer copolymerizable with the ethylenically unsaturated nitrile monomer and the ethylenically unsaturated acid monomer includes a vinyl aromatic monomer, fluoroalkylvinyl ether, an ethylenically unsaturated amide monomer, vinyl pyridine, vinyl norbonene, an unconjugated diene monomer, an ethylenically unsaturated carboxylic acid ester monomer, or a combination of the above.

A reactive compound including two or more reactive groups is poly (tetramethylene ether) glycol diglycidyl ether, a compound of 3-alkoxy-2-hydroxy propyl acrylate having an alkoxy group composed of twelve carbon atoms and thirteen carbon atoms, propylene glycol polybutylene glycol monoacrylate or a combination of the above.

At the time of emulsion polymerization of the monomers, an emulsifier, a polymerization initiator, a molecular weight regulator, or a combination of the above is further included.

The present invention provides a method for manufacturing a dip formed article comprising (a) attaching a coagulant on the surface of a dip forming mold by dipping the dip forming mold of a hand shape into a coagulant solution; (b) forming a dip forming layer by dipping the dip forming mold to which the coagulant is attached into a latex resin composition of the above; and (c) crosslinking the latex resin by applying a heat treatment to the dip forming layer formed in the dip forming mold.

The coagulant is barium chloride, calcium chloride, magnesium chloride, zinc chloride, aluminum chloride, barium nitrate, calcium nitrate, zinc nitrate, barium acetate, calcium acetate, zinc acetate, calcium sulfate, magnesium sulfate, or aluminum sulfate.

BEST MODE

The present invention will now be described in detail as follows.

The present invention relates to a latex resin composition for rubber gloves further comprising a reactive compound including two or more reactive groups, the latex resin composition for rubber gloves including a conjugated diene monomer; an ethylenically unsaturated nitrile monomer; an ethylenically unsaturated acid monomer; and an ethylenically unsaturated monomer copolymerizable with the ethylenically unsaturated nitrile monomer and the ethylenically unsaturated acid monomer.

A latex resin composition according to the present invention includes 40~90 weight % of a conjugated diene monomer; 9~50 weight % of an ethylenically unsaturated nitrile monomer; 0.1~10 weight % of an ethylenically unsaturated acid monomer; 0.1~20 weight % of an ethylenically unsaturated monomer copolymerizable with the monomer; and 0.1~5 weight % of an reactive compound including two or more reactive groups.

The conjugated diene monomer is 1,3-butadiene, 2,3-dimethyl-1,3-butadiene, 2-ethyl-1,3-butadiene, 1,3-pentadiene, or isoprene, which can be used individually or by a combination of two or more kinds of the above. Among the above, 1,3-butadiene and isoprene are preferable; in particular, 1,3-butadiene is more preferred.

The amount of the conjugated diene monomer used is 40~90 weight % of a monomer mixture, preferably 45~80 weight % thereof. If the amount of the conjugated diene monomer used is too little, latex resin formed article becomes hard and a wearing feeling thereof deteriorates. On the other hand, if the amount of the conjugated diene monomer used is too much, oil resistance of the latex resin formed article becomes worse and tensile strength thereof is reduced.

The ethylenically unsaturated nitrile monomer is acrylonitrile, methacrylonitrile, fumaronitrile, α-chloronitrile, or α-cyanoethylacrylonitrile, where the ethylenically unsaturated nitrile monomer can be used individually or by a combination of two or more kinds of the above. Among the above, acrylonitrile and methacrylonitrile are preferable; in particular, acrylonitrile is more preferred.

The amount of ethylenically unsaturated nitrile monomer used is 9~50 weight % of a monomer mixture, preferably 15~45 weight % thereof. If the amount of the ethylenically unsaturated nitrile monomer used is too little, oil resistance of the latex resin formed article becomes worse and tensile strength thereof is reduced; on the other hand, if too much, the latex resin formed article becomes hard and a wearing feeling thereof deteriorates.

The ethylenically unsaturated acid monomer is an ethylenically unsaturated monomer containing an acid group such as carboxylic group, sulfonic acid group, or acid anhydride group; for example, ethylenically unsaturated carboxylic acid monomers such as acrylic acid, metacrylic acid, itaconic acid, maleic acid, and fumaric acid; polycarboxylic acid anhydrides such as maleic acid anhydride and citraconic acid anhydride; an ethylenically unsaturated sulfonic acid monomer such as styrene sulfonic acid, ethylenically unsaturated polycarboxylic acid partial ester monomers such as fumaric acid monobutyl, maleic acid monobutyl, and maleic acid mono-2-hydroxypropyl. Among the above, an ethylenically unsaturated carboxylic monomer is preferable; in particular, metacrylic acid is more preferred. The ethylenically unsaturated acid monomer can be used in the form of alkali metal salt or ammonium salt. The ethylenically unsaturated acid monomer can be used individually or by a combination of two or more kinds thereof.

The amount of ethylenically unsaturated acid monomer used is 0.1~10 weight % of a monomer mixture; preferably 0.5~9 weight %, more preferably 1~8 weight %. If the amount of the ethylenically unsaturated acid monomer used is too little, tensile strength of the latex resin formed article is reduced; on the other hand, if too much, the latex resin formed article becomes hard and a wearing feeling thereof deteriorates.

The other ethylenically unsaturated monomer which can be copolymerizable with the ethylenically unsaturated nitrile monomer and the ethylenically unsaturated acid monomer includes vinyl aromatic monomers such as styrene, alkyl styrene, and vinyl naphthalene; fluoroalkyl vinyl ether such as fluoroethyl vinyl ether; ethylenically unsaturated amide monomers such as (meta)acrylamide, N-methylol (meta)acrylamide, N,N-dimethylol (meta)acrylamide, N-methoxy methyl (meta)acrylamide, and N-propoxy methyl(meta)acrylamide; vinyl pyridine; vinyl norbonene; an non-conjugated diene monomer such as 1,4-hexadiene and dicyclopentadiene; and ethylenically unsaturated carboxylic acid ester monomers such as (meta)acrylic acid methyl, (meta)acrylic acid ethyl, (meta)acrylic acid butyl, (meta)acrylic acid-2-ethyl hexyl, (meta)acrylic acid tri fluorine ethyl, (meta)acrylic acid tetra fluorine propyl, maleic acid dibutyl, fumaric acid dibutyl, maleic acid diethyl, (meta)acrylic acid methoxy methyl, (meta)acrylic acid ethyoxy ethyl, (meta)acrylic acid methoxy ethyoxy ethyl, (meta)acrylic acid cyano methyl, (meta)acrylic acid 2-cyano ethyl, (meta)acrylic acid 1-cyano propyl, (meta)acrylic acid 2-ethyl-6-cyano hexyl, (meta)acrylic acid 3-cyano propyl, (meta)acrylic acid hydroxyl ethyl, (meta)acrylic acid hydroxyl propyl, glycidyl (meta)acrylate, and dimethylamino ethyl (meta)acrylate. The ethylenically unsaturated monomer can be used individually or by a combination of two or more of the above. The amount of the ethylenically unsaturated monomer used is 0.1~20 weight % of a monomer mixture. If the amount of the ethylenically unsaturated monomer used is too much, balance between a soft wearing feeling and tensile strength.

A reactive compound including two or more of the reactive group is a reactive compound of a relatively large molecular weight having two or more reactive groups such as vinyl, epoxy, and glycidyl group, allowing to obtain a latex resin formed article by using neither sulfur nor a vulcanization accelerator. Examples of the reactive compound include poly (tetra methylene ether) glycol diglycidyl ether (molecular weight of about 860); a mixture (molecular weight of about 330) of 3-alcoxy-2-hydroxypropyl acrylate having an alcoxy group composed of 12 carbon atoms and 13 carbon atoms; and propylene glycol is polybutylene glycol mono-acrylate (molecular weight of about 562). The compounds can be used individually or by a combination of two or more compounds.

Among the compounds, available is poly (tetra methyl ether) glycol diglycidyl ether, for example, PTMG-DEP which is a synthetic resin regulator manufactured by Yokkaichi Chemical Co., Japan. Also, a mixture of 3-alcoxy-2-hydroxypropyl acrylate having an alcoxy group composed of 12 carbon atoms and 13 carbon atoms such as TD-EXA, a synthetic resin regulator manufactured by Yokkaichi Chemical Co., Japan can be used. In addition, propylene glycol polybutylene glycol mono-acrylate such as BLEMMER 10APB-500B, a synthetic resin regulator manufacture by NOF Co.

The preferable amount of the reactive compound used is 0.1~5 weight % of the whole latex resin composition, more preferably 0.5~3 weight %. If the amount of the reactive compound is less than 0.1 weight %, tensile strength of the dip formed article is reduced while a touch feeling and a wearing feeling become degraded if more than 5 weight %.

In the following, a method for manufacturing a latex resin composition according to the present invention is described.

A latex resin composition according to the present invention can be manufactured by emulsion polymerization of a mixture of the respective monomers above; and a method of emulsion polymerization can employ a traditional emulsion polymerization method.

A method for adding a mixture of monomers is not limited to a specific one but any one of a method of adding a mixture of monomers into a polymerization reactor at the same time, a method of adding a mixture of monomers into a polymerization reactor sequentially, a method of adding a part of a mixture of monomers into a polymerization reactor and providing the remaining monomers into the polymerization reactor sequentially can be equally employed.

Temperature of a polymerization reactor is not limited to a specific one but usually ranges from 10 to 90° C., more preferably, 25~75° C.

At the time of emulsion polymerization, commonly used materials such as an emulsifier, a polymerization initiator, and a molecular weight regulator can be included.

Though not particularly limited to the following, an anionic surfactant, a nonionic surfactant, a cationic surfactant, and an ampholytic surfactant can be used as an emulsifier. Among the above, anionic surfactants such as alkyl benzene sulfonic acid salt, aliphatic sulfonic acid salt, higher alcohol sulfuric acid ester salt, -olefin sulfonic acid salt, and alkyl ether sulfuric acid ester salt can be used preferably. The preferred amount of an emulsifier used is 0.3~10 parts by weight for every 100 parts by weight of the whole monomer, more preferably 0.8~8 parts by weight.

Though not particularly limited to the following, a radical initiator can be preferably used as a polymerization initiator. Examples of a radical initiator include inorganic peroxides such as sodium persulfate, potassium persulfate, ammonium persulfate, potassium superphosphate, and hydrogen peroxide; is organic peroxides such as t-butyl peroxide, cumene hydroperoxide, p-menthane hydroperoxide, di-t-butyl peroxide, t-butylcumyl peroxide, acetyl peroxide, isobutyl peroxide, octanoyl peroxide, dibenzoyl peroxide, 3,5,5-trimethylhexanol peroxide, and t-butyl peroxi isobutylate; and nitrogen compounds such as azobis isobutyronitrile, azobis-2,4-di methylvaleronitrile, azobiscyclohexane carbonitrile, and azobis iso-butyric acid (butyl acid) methyl. The polymerization initiator can be used individually or by a combination of two or more kinds of the above. Among the radical initiators, using inorganic or organic peroxide is preferred; more preferably, inorganic peroxide; more particularly, persulfate is preferred. The preferred amount of a polymerization initiator used is 0.01~2 parts by weight for every 100 parts by weight of the whole monomer, more preferably 0.02~1.5 parts by weight.

Though not particularly limited to the following, examples of a molecular weight regulator include mercaptan types such as -methylstyrene, t-dodecyl mercaptan, n-dodecyl mercaptan, and octyl mercaptan; halogenated hydrocarbons such as carbon tetrachloride, methylene chloride, and methylene bromide; and sulfur containing compounds such as tetra ethyl thiuram di sulphide, pentamethylene thiuram di sulphide, and diisopropylxanthogen disulfide'. The molecular weight regulator can be used individually or by a combination of two or more kinds of the above. Among the above, mercaptan type is preferred, more preferably, t-dodecyl mercaptan. The preferred amount of a molecular weight regulator used, though varied according to the type used, is 0.1~0.9 parts by weight for every 100 parts by weight of the whole monomer, more preferably 0.2~0.7 parts by weight.

Also, at the time of polymerization of a latex according to the present invention, sub-materials can be used according to the needs, including a pigment such as titanium oxide, a filler such as silica, a thickener, a chelating agent, a dispersant, a pH regulator, a deoxidation agent, a particle diameter regulator, an anti-oxidant, an oxygen scavenger.

Depending on a situation, the polymerization reaction above is stopped to remove unreactive monomers and a density of solid content or pH is adjusted to obtain a latex resin according to the present invention.

Traditional methods can be used for a method for manufacturing a dip formed article by using a latex resin composition according to the present invention; and at the same time, other methods such as a direct steeping method, an anode adhesion steeping method, and a Teague adhesion steeping method can be used for the same purpose. Among the above, an anode adhesion steeping method is preferred since a dip formed article with a uniform thickness can be obtained.

In what follows, a method for manufacturing a dip formed article by using a latex resin composition according to the present invention is described in detail.

(a) Attaching a Coagulant on the Surface of a Dip Forming Mold by Dipping the Dip Forming Mold of a Hand Shape into a Coagulant Solution Examples of a coagulant include metal halides such as barium chloride, calcium chloride, magnesium chloride, zinc chloride, and aluminum chloride; nitrates such as barium nitrate, calcium nitrate, and zinc nitrate; acetates such as barium acetate, calcium acetate, magnesium acetate, and zinc acetate; and sulphates such as calcium sulphate, magnesium sulphate, and aluminum sulphate. Among the above, calcium chloride and calcium nitrate are preferred.

A coagulant solution is made by dissolving the coagulant into water, alcohol, or a mixture of the above. Density of the coagulant in the coagulant solution is usually 5~75 weight %, preferably 15~55 weight %.

(b) Forming a Dip Forming Layer by Dipping a Dip Forming Mold to which a Coagulant is Attached into a Latex Resin Composition A dip forming mold to which a coagulant is attached is dipped into a latex composition for dip forming made by using a latex resin composition according to the present invention; a dip forming mold is then taken off and a dip forming layer is formed in the dip forming mold.

(c) Crosslinking a Latex Resin by Applying a Heat Treatment to a Dip Forming Layer Formed in a Dip Forming Mold At the time of the heat treatment, water is first vaporized and hardening by crosslinking is performed.

Next, a dip forming layer crosslinked by the heat treatment is taken off from the dip forming mold, thus obtaining a dip formed article.

MODE FOR INVENTION

In what follows, the present invention is described in detail by using embodiments and comparative examples. The embodiments below have been introduced to describe the present invention; the scope of the present invention includes the scope defined by the appended claims and modifications and substitutions thereof; and is not limited by the scope of the present embodiments.

Embodiment 1

(Manufacturing of a Latex Resin Composition)

21 parts by weight of Acrylonitrile, 74 parts by weight of 1,4-butadiene, 5 parts by weight of metacrylic acid, 0.5 parts by weight of tert-dodecyl mercaptan, 2.3 parts by weight of sodium dodecyl benzene sulfonate, 140 parts by weight of water, and 1 parts by weight of poly (tetramethylene ether) glycol diglycidyl ether (PTMG-DEP, Yokkaichi Chemical) (molecular weight 860) are input and temperature is raised to 40° C. and polymerization is started. If conversion rate reaches 65%, temperature is raised to 70° C. and polymerization is made to proceed; if 94%, 0.2 parts by weight of sodium dimethyldithiocarbamate are input and polymerization is stopped. Through a de-ordorization process, unreactive monomers are removed and by adding ammonia water, an antioxidant, and an antiforming agent, carboxylic acid modified-nitrile based copolymer latex having a density of solid content of 44.5% and pH 8.0 is obtained.

By adding 5% potassium hydroxide solution and an appropriate amount of secondary distilled water into the latex, a composition for dip forming having a density of solid content of 30% and pH 9.5 is obtained.

(Manufacturing of a Dip Formed Article)

A coagulant solution is made by combining 22 parts by weight of calcium nitrate, 69.5 parts by weight of methanol, 8 parts by weight of calcium carbonate, and 0.5 parts by weight of wetting agent (Teric 320 produced by Huntsman Corporation, Australia). A ceramic mold of a hand shape is dipped into the solution for one minute; the ceramic mold is taken out and dried for three minutes at 70° C. so that a coagulant is deposited on the mold of the hand shape.

Next, the coagulant deposited mold is dipped into the composition for dip forming for one minute. The dipped mold is taken out and dried for one minute at 70° C. and then leached by being dipped into warm water for three minutes. The mold is dried again for three minutes at 70° C. and crosslinked for 20 minutes at 125° C. A dip formed article in a hand shape is obtained by taking off a crosslinked dip forming layer from the mold. Table 1 illustrates physical properties of the dip formed article.

Embodiment 2

A dip formed article in a hand shape is manufactured in the same way as the embodiment 1 except that 3 parts by weight of poly (tetramethylene ether) glycol diglycidyl ether (PTMG-DEP, Yokkaichi Chemical) (molecular weight 860) are used instead of 1 parts by weight thereof. The corresponding physical properties are shown in Table 1.

Embodiment 3

A dip formed article in a hand shape is manufacture in the same way as the embodiment 1 except that 1 parts by weight of TD-EXA (a synthetic resin regulator, Yokkaichi Chemical) (molecular weight 330), which is a mixture of 3-alcoxy-2-hydroxypropyl acrylate having an alcoxy group composed of 12 carbon atoms and 13 carbon atoms, is used instead of 1 parts by weight of poly (tetramethylene ether) glycol diglycidyl ether (PTMG-DEP, Yokkaichi Chemical) (molecular weight 860). The corresponding physical properties are shown in Table 1.

Embodiment 4

A dip formed article in a hand shape is manufactured in the same way as the embodiment 2 except that 1.5 parts by weight of poly (tetramethylene ether) glycol diglycidyl ether (PTMG-DEP, Yokkaichi Chemical) (molecular weight 860) and 1.5 parts by weight of TD-EXA (a synthetic resin regulator, Yokkaichi Chemical) (molecular weight 330), which is a mixture of 3-alcoxy-2-hydroxypropyl acrylate having an alcoxy group composed of 12 carbon atoms and 13 carbon atoms, are used instead of 3 parts by weight of poly (tetramethylene ether) glycol diglycidyl ether (PTMG-DEP, Yokkaichi Chemical) (molecular weight 860). The corresponding physical properties are shown in Table 1.

Comparative Example 1

A dip formed article in a hand shape is manufactured in the same way as the embodiment 1 except that 1 parts by weight of poly (tetramethylene ether) glycol diglycidyl ether (PTMG-DEP, Yokkaichi Chemical) (molecular weight 860) are not used for polymerization. The corresponding physical properties are shown in Table 1.

Comparative Example 2

A dip formed article in a hand shape is manufactured in the same way as the embodiment 1 except that 1 parts by weight of polyepichlorohydrin are used for polymerization instead of 1 parts by weight of poly (tetramethylene ether) glycol diglycidyl ether (PTMG-DEP, Yokkaichi Chemical) (molecular weight 860). The corresponding physical properties are shown in Table 1.

Experimental Example

Physical properties of an obtained dip formed article are evaluated by using the following methods.

1. A Method for Measuring Stress at Elongation Modulus of 300%, Tensile Strength, and Elongation A test specimen in the shape of a dumbbell is manufactured in accordance to ASTM D-142 specifications from the obtained dip formed article. Afterwards, the test specimen is pulled with an elongation speed of 500 mm/min. Stress at elongation modulus of 300%, tensile strength at the time of fracture, and elongation modulus at the time of fracture are measured.

2. A Method for Measuring Tensile Strength Retention

Both ends of the test specimen in the shape of a dumbbell are elongated at the speed of 500 mm/min. Elongation of the test specimen is stopped when the test specimen's standard length of 20 mm is elongated up to 40 mm. Stress M100(0) is then measured; after six minutes while keeping the test specimen in the same conditions, stress M100(6) is measured.

The value of M100(6) with respect to M100(0) is calculated by a percentage and the percentage value is defined as a stress retention rate. If stress retention rate is 50% or more, it is determined that fitness is excellent.

TABLE 1

| | Tensile Strength (MPa) | Elongation (%) | Modulus at 300% (MPa) | Tensile strength retention (%) | Glove status |
|---|---|---|---|---|---|
| Embodiment 1 | 21.7 | 669 | 3.60 | 60 | Good |
| Embodiment 2 | 24.8 | 643 | 3.60 | 67 | Good |
| Embodiment 3 | 19.3 | 685 | 4.96 | 62 | Good |
| Embodiment 4 | 26.5 | 626 | 3.52 | 68 | Good |
| Comparative example 1 | 5.6 | 730 | 2.39 | 40 | Bad |
| Comparative example 2 | 9.8 | 711 | 2.60 | 43 | Average |

The glove status of Table 1 reflects the evaluation result by collectively taking account of basic physical properties of the gloves, whether pinholes have been generated, and stickiness thereof.

As shown in the embodiments 1~4 of Table 1, by using a reactive compound including two or more reactive groups during a polymerization process of a carboxylic acid modified-nitrile based copolymer latex, gloves with excellent physical properties could be manufactured without sulfur or a vulcanization accelerator. In addition, since a long maturation process included in a traditional glove manufacturing process is not required, productivity could be improved.

On the other hand, as shown in comparative examples 1 and 2, if a reactive compound including two or more reactive groups is not used, gloves in a good status could not be manufactured without using sulfur or a vulcanization accelerator. This is because crosslinking of gloves is not made due to the absence of a reactive compound including two or more reactive groups or sulfur and a vulcanization accelerator; and therefore, sufficient strength for using the gloves is not secured.

Advantageous Effects of the Invention

The present invention provides a latex resin composition with which rubber gloves can be manufactured using neither sulfur nor a vulcanization accelerator. By using the latex resin composition, not only an adverse effect caused by traditional sulfur and vulcanization accelerator is reduced but also rubber gloves with excellent physical properties can be provided.

What is claimed is:

1. A latex resin composition for rubber gloves comprising monomers to be polymerized, the monomers are (a) a conjugated diene monomer; (b) an ethylenically unsaturated nitrile monomer; (c) an ethylenically unsaturated acid monomer; (d) an ethylenically unsaturated monomer copolymerizable with the ethylenically unsaturated nitrile monomer and the ethylenically unsaturated acid monomer; and (e) a reactive compound having two or more reactive groups, wherein the molecular weight of the reactive compound having two or more groups is 250 or more, wherein the reactive compound having two or more reactive groups is poly (tetramethylene ether) glycol diglycidyl ether, a compound of 3-alkoxy-2-hydroxy propyl acrylate having an alkoxy group composed of twelve carbon atoms and thirteen carbon atoms, propylene glycol polybutylene glycol monoacrylate, or a combination thereof, wherein the latex resin composition excludes both vulcanization accelerator and sulfur, and wherein the content of the composition includes 40-90 weight % of the conjugated diene monomer; 9-50 weight % of the ethylenically unsaturated nitrile monomer; 0.1-10 weight % of the ethylenically unsaturated acid monomer; 0.1-20 weight % of the ethylenically unsaturated monomer copolymerizable with the ethylenically unsaturated nitrile monomer and the ethylenically unsaturated acid monomer; and 0.1-5 weight % of the reactive compound having two or more reactive groups.

2. The latex resin composition of claim 1, wherein the conjugated diene monomer is 1,3-butadiene, 2,3-dimethyl-1,3-butadiene, 2-ethyl-1,3-butadiene, 1,3-pentadiene, isoprene, or a combination of the above.

3. The latex resin composition of claim 1, wherein the ethylenically unsaturated nitrile monomer is acrylonitrile, methacrylonitrile, α-cyanoethylacrylonitrile, α-chloronitrile, fumaronitrile, or a combination thereof.

4. The latex resin composition of claim 1, wherein the ethylenically unsaturated acid monomer is ethylenically unsaturated carboxylic acid monomer, polycarboxylic acid anhydride, ethylenically unsaturated sulfonic acid monomer, ethylenically unsaturated polycarboxylic acid partial ester monomer, or a combination of the above.

5. The latex resin composition of claim 1, wherein an ethylenically unsaturated monomer copolymerizable with the ethylenically unsaturated nitrile monomer and the ethylenically unsaturated acid monomer includes a vinyl aromatic monomer, fluoroalkylvinyl ether, an ethylenically unsaturated amide monomer, vinyl pyridine, vinyl norbonene, an unconjugated diene monomer, an ethylenically unsaturated carboxylic acid ester monomer, or a combination of the above.

6. The latex resin composition of claim 1, wherein an emulsifier, a polymerization initiator, a molecular weight regulator, or a combination of the above is further added to the composition.

7. A method for manufacturing a dip formed article, comprising:
(a) attaching a coagulant on a surface of a dip forming mold by dipping the dip forming mold of a hand shape into a coagulant solution;
(b) forming a dip forming layer by dipping the dip forming mold to which the coagulant is attached, into a latex resin composition corresponding to claim 1; and
(c) crosslinking the latex resin by applying a heat treatment to the dip forming layer formed in the dip forming mold.

8. The method of claim 7, wherein the coagulant is barium chloride, calcium chloride, magnesium chloride, zinc chloride, aluminum chloride, barium nitrate, calcium nitrate, zinc nitrate, barium acetate, calcium acetate, zinc acetate, calcium sulfate, magnesium sulfate, or aluminum sulfate.

* * * * *